United States Patent
Henning et al.

(10) Patent No.: US 11,345,325 B2
(45) Date of Patent: May 31, 2022

(54) ELECTROMECHANICAL BRAKE ACTUATOR

(71) Applicant: WABCO Europe BVBA, Brussels (BE)

(72) Inventors: Paul Henning, Schwetzingen (DE); Eugen Kloos, Viernheim (DE)

(73) Assignee: WABCO Europe BVBA, Brussels (BE)

( * ) Notice: Subject to any disclaimer, the term of this patent is extended or adjusted under 35 U.S.C. 154(b) by 14 days.

(21) Appl. No.: 16/500,588

(22) PCT Filed: Apr. 9, 2018

(86) PCT No.: PCT/EP2018/058975
§ 371 (c)(1),
(2) Date: Oct. 3, 2019

(87) PCT Pub. No.: WO2018/206204
PCT Pub. Date: Nov. 15, 2018

(65) Prior Publication Data
US 2020/0062230 A1 Feb. 27, 2020

(30) Foreign Application Priority Data
May 9, 2017 (DE) .................... 10 2017 004 436.8

(51) Int. Cl.
*F16D 55/08* (2006.01)
*B60T 13/74* (2006.01)
(Continued)

(52) U.S. Cl.
CPC .......... *B60T 13/741* (2013.01); *F16D 55/226* (2013.01); *F16D 65/183* (2013.01);
(Continued)

(58) Field of Classification Search
CPC ............. F16D 2125/28; F16D 2125/30; F16D 2125/32; F16D 2125/50; F16D 2121/24;
(Continued)

(56) References Cited

U.S. PATENT DOCUMENTS

| 5,000,295 A | * | 3/1991 | Fargier | .................. B60T 13/741 188/72.1 |
| 2004/0026195 A1 | * | 2/2004 | Baier-Welt | .............. F16D 65/28 188/265 |

(Continued)

FOREIGN PATENT DOCUMENTS

| AT | 516801 A2 | 8/2016 |
| CH | 385981 A | 12/1964 |

(Continued)

OTHER PUBLICATIONS

Machine translation of DE 102009057330 (no date).*
(Continued)

*Primary Examiner* — Nicholas J Lane
(74) *Attorney, Agent, or Firm* — Dickinson Wright PLLC (57) ABSTRACT

An electromechanical brake actuator (102, 202, 302, 402) for a brake, in particular a commercial vehicle disc brake, has an electric motor (106, 206) for generating a drive torque, a cam disc (108, 208, 308, 408) operatively connected to the electric motor (106, 206) and mounted in a rotationally movable manner, and a brake plunger (114, 214, 314) which can be moved along a plunger axis for the actuation of a brake lever (358) of the brake (368). The cam disc (108, 208, 308, 408) and the brake plunger (114, 214, 314) have contact faces which are in contact with one another and slide or roll on one another for the direct transmission of the drive torque between the cam disc (108, 208, 308, 408) and the brake plunger (114, 214, 314).

20 Claims, 12 Drawing Sheets (51) Int. Cl.
  *F16D 55/226* (2006.01)
  *F16D 65/18* (2006.01)
  *F16D 121/24* (2012.01)
  *F16D 125/28* (2012.01)
  *F16D 125/48* (2012.01)
  *F16D 125/50* (2012.01)
  *F16D 125/64* (2012.01)

(52) U.S. Cl.
  CPC ...... *F16D 2121/24* (2013.01); *F16D 2125/28* (2013.01); *F16D 2125/48* (2013.01); *F16D 2125/50* (2013.01); *F16D 2125/64* (2013.01)

(58) Field of Classification Search
  CPC .. F16D 55/226; F16D 65/183; F16D 2125/64; B60T 13/741
  See application file for complete search history.

(56) References Cited

U.S. PATENT DOCUMENTS

| | | | | |
|---|---|---|---|---|
| 2007/0273198 A1* | 11/2007 | Tonoli | ............ | F16D 65/567 303/3 |
| 2011/0155520 A1 | 6/2011 | Takahashi et al. | | |
| 2018/0038428 A1* | 2/2018 | Severinsson | ........ | F16D 55/2245 |
| 2018/0058525 A1* | 3/2018 | Kasper | ............ | F16D 51/28 |
| 2021/0054888 A1* | 2/2021 | Henning | ............ | F16D 65/028 |

FOREIGN PATENT DOCUMENTS

| | | | | |
|---|---|---|---|---|
| DE | 19851668 A1 | 5/2000 | | |
| DE | 19907958 A1 | 9/2000 | | |
| DE | 10140075 A1 | 2/2003 | | |
| DE | 69920133 T2 | 9/2005 | | |
| DE | 102005049760 A1 | 4/2007 | | |
| DE | 102009057330 A1 * | 6/2011 | ............ | F16D 65/18 |
| DE | 102009057330 A1 | 6/2011 | | |
| EP | 1798123 A1 | 6/2007 | | |
| FR | 2496804 A1 | 6/1982 | | |
| WO | 2014139919 A1 | 9/2014 | | |

OTHER PUBLICATIONS

European Patent Office, Rijswijk, Netherlands, International Search Report of International Application No. PCT/EP2018/058975, dated Jul. 18, 2018, 3 pages.

* cited by examiner

ELECTROMECHANICAL BRAKE ACTUATOR

TECHNICAL FIELD

The present disclosure relates to an electromechanical brake actuator for a brake, in particular a commercial vehicle disc brake, having an electric motor for generating a drive torque, a cam disc which is operatively connected to the electric motor and is mounted in a rotationally movable manner, and a brake plunger which can be moved along a plunger axis for the actuation of a brake lever of the brake.

BACKGROUND

Electromechanical brake actuators are generally known in the motor vehicle branch, in particular the commercial motor vehicle branch. For example, AT 516801 A2 discloses an electromechanical brake actuator of this type. The aim is generally to operate a brake by means of electric energy. One challenge consists in realizing sufficiently low brake actuation times and at the same time achieving a desired brake power by means of an electric motor which is as small and economical as possible. To this end, AT 516801 A2 proposes an electromechanical actuator which has two transmission members. A coupling member is provided on the first transmission member, on which coupling member a sensing element is arranged.

The second transmission member has a lift curve. The sensing element senses the lift curve, the second transmission member applying the input torque for the first transmission member, and the input torques of the first transmission member resulting in a zero curve over the rotational angle for different wear states of the brake lining.

Systems such as the abovementioned have the disadvantage, however, that the structural construction has a high complexity which is firstly expensive with regard to manufacturing and assembly, and secondly obstructs simple maintainability. A significant space requirement of the arrangement also arises on account of the multiplicity of components.

Against this background, the present disclosure was based on the object of specifying an electromechanical brake actuator which overcomes the above-described disadvantages as far as possible. In particular, the object was based on indicating an electromechanical brake actuator which enables a high brake power with a simultaneously low component complexity and a required drive power which is as low as possible with apparatus complexity which is as low as possible.

In the case of an electromechanical brake actuator of the type described at the outset, the object, on which the present disclosure is based, is achieved by this disclosure by the cam disc and the brake plunger having contact faces which are in contact with one another and slide or roll on one another for the direct transmission of the drive torque between the cam disc and the brake plunger.

The present disclosure relates primarily to disc brakes, the counterpart which corresponds to the brake lining in the case of a disc brake being the brake disc. In principle, however, the present disclosure can also be used in conjunction with drum brakes.

The present disclosure utilizes the finding that a cam disc can be used, in conjunction with a brake plunger which is in contact on a contact face, to convert a rotational movement of the cam disc directly into a non-linear movement of the brake plunger.

This results in the advantage that a low-loss transmission of force takes place by way of direct contact of this type, which low-loss transmission of force at the same time manages with few components overall. Furthermore, the installation space overall can be kept low and at the same time a high operational reliability can be achieved by way of a construction of this type.

The contact face of the cam disc is preferably configured in such a way that a non-linear transmission of force takes place from the cam disc to the brake plunger in a manner which is dependent on the angular position between the cam disc and the axis of the brake plunger. This non-linear transmission is preferably designed in such a way that, for example in order to overcome the air gap between the brake shoe and the brake disc, great advancing distances can first of all be realized in the case of a relatively low transmission of brake force, whereas, in a range which requires an application of great brake forces, a greater brake force can be achieved in the case of a smaller advance of the brake plunger.

The circumference of the cam disc is preferably of non-cylindrical configuration. As an alternative or in addition, moreover, the cam disc is preferably arranged eccentrically on a shaft.

An arrangement or configuration of this type of the cam disc makes it possible to realize a non-linear transmission of force from the cam disc to the brake plunger with a minimum number of parts of the assembly. In particular, targeted setting of the brake force and advancing distance for a defined rotational angular range of the cam disc can take place by way of an adaptation of these parameters.

The present disclosure is advantageously developed by virtue of the fact that the brake plunger can be moved back and forth between a withdrawn position and a deflected position, and the cam disc can be moved back and forth between a starting position and an end position, the starting position of the cam disc corresponding with the withdrawn position of the brake plunger, and the end position of the cam disc corresponding with the deflected position of the brake plunger.

As a result, it is made possible for the brake plunger to be operated over its entire movement range via the cam disc, in particular with optimization of the parameters of brake force and advancing distance.

Furthermore, it is preferred that the contact faces of the brake plunger and the cam disc bear against one another at a contact point, and define a contact angle relative to the axis of the plunger at the contact point, and the contact angle decreases in size from the starting position in the case of an increasing rotation of the cam disc. This entails the effect that a rotational angular change of the cam disc in a range of small deflections of the brake plunger leads to a greater distance on the part of the brake plunger being overcome with a smaller transmitted brake force, and, in the range of the maximum deflection of the brake plunger, an equivalent rotational angular change resulting in a smaller deflection of the brake plunger with a higher transmitted force.

In a further preferred embodiment, the electromechanical brake actuator has a gear mechanism which is driven by the electric motor and which is operatively connected to the cam disc.

A gear mechanism which is connected between the electric motor and the cam disc makes it possible for the electric motor to be operated in a more efficient operating range. It is therefore made possible overall to use comparatively small electric motors in terms of the power output.

Furthermore, the gear mechanism in accordance with one preferred embodiment has an epicyclic gear mechanism, preferably a planetary gear mechanism.

A gear mechanism of this type provides a high rotational speed reduction and torque increase with low power losses in a small installation space.

In accordance with one preferred development, the gear mechanism additionally has a further gear stage, preferably configured as a spur gear mechanism which is connected upstream or downstream of the electric motor or the epicyclic gear mechanism. If required, a further rotational speed reduction with a corresponding torque increase and an installation space which is still compact can be realized by way of a gear mechanism of this type which, as an alternative, can also be configured as a planetary gear mechanism or a harmonic drive (also called a strain wave gear mechanism or an ellipto-centric gear mechanism).

A further preferred embodiment is distinguished by the fact that the cam disc has an indentation in its circumference for defining a parking brake position, the indentation being arranged between a contact point with the brake plunger in the starting position and a contact point with the brake plunger in the end position. If the cam disc is situated with its indentation in a contact position of this type, the brake power which is provided in this position and is introduced via the brake plunger remains constant, even if the driving electric motor is no longer supplied with electric energy. The parking brake power can be modulated by way of expedient positioning of the indentation. This functionality correlates with a low structural complexity and, moreover, is easy to maintain and is mechanically reliable.

The indentation is preferably arranged in such a way that the brake plunger transmits a brake power in a range of from approximately 80% to approximately 100% of the overall brake power when it is arranged in the indentation. A parking brake functionality can be realized with a low number of components by way of a functional integration of this type. Furthermore, this has a positive effect on the required installation space of the apparatus.

A further preferred embodiment is distinguished by a spring element which is operatively connected to the electric motor in such a way that energy is stored in a first deflection distance region of the brake plunger, and energy is output to the brake plunger in a second deflection distance region of the brake plunger. This results in the advantage that energy can be stored in the spring element in a first deflection distance region of the brake plunger, in the case of which first deflection distance region this brake plunger has to overcome substantially the air gap between the brake disc and the brake shoe and merely a low advancing force is required, which energy can then be applied to the brake plunger in a manner which assists the drive power of the electric motor in a second deflection distance region, in the case of which a high brake force transmission to the brake plunger is required. This results overall in the advantage that a higher brake power can be achieved by way of a low-power electric motor. Moreover, a design principle of this type makes it possible for the spring element to be arranged as desired and with optimum utilization of the existing installation space in 360° around the axis of the cam disc.

In a further preferred embodiment, the spring element has an interaction face which is in contact with a circumferential face of a cam which is driven by the electric motor, the interaction face of the spring element and the circumferential face of the cam sliding or rolling on one another, and the circumferential face of the cam being shaped in such a way that energy is stored in the spring element in a first rotational angular range of the cam, and energy is output from the spring element in a second rotational angular range.

An arrangement of this type results in the advantage that the cam is suitable both to prestress the spring element and therefore to store energy, and to be pressed in the movement direction by the spring element, whereby energy is output via a shaft finally to the electric motor, and beyond this, also to the cam disc. Therefore, the overall advantage again lies in an implementation with minimized component complexity, which is easy to maintain and has a high reliability.

The cam preferably has a third rotational angular range, in which the spacing of the axis of the rotary shaft from the circumference of the cam is substantially constant. This entails the advantage that the cam can be used directly for the definition of a parking brake position, in which the spring element is compressed and acts on the cam in such a way that the latter remains at the relevant location even without the application of drive power. As a result, the parking brake position can also be defined in such a way that a brake power of from approximately 50% to approximately 80% of the overall brake power is transmitted. A brake power of this type is sufficient with regard to ensuring a sufficient parking brake force, and at the same time remains clearly below the maximum brake force transmission. As a result, it becomes possible for components to be dimensioned with regard to lower permanently prevailing loads, as a result of which material costs, weight and installation space overall can be influenced advantageously.

The spring force of the spring element preferably inhibits a rotation of the cam in the third rotational angular range of the cam in such a way that, in the case of a discontinuation of the drive torque of the electric motor, the brake plunger is held in the corresponding deflection. Reference is also to be made to the above embodiments with regard to the advantages.

In accordance with a further alternatively preferred embodiment, the spring element has an interaction head which is in contact with a track which is applied on the cam disc in the axial direction and is contoured in such a way, in particular has a track depth which varies along its length, that energy is stored in the spring element in a first rotational angular range of the cam disc, and energy is output from the spring element in a second rotational angular range. An alternative embodiment of this type entails the advantage that a reduction in the number of parts of the electromechanical brake actuator can be realized. The cam disc interacts with the spring element directly via the track which is applied on this cam disc. Furthermore, a design principle of this type makes it possible for the spring element to be arranged as desired and with optimum utilization of the existing installation space on any desired side of the cam disc.

In accordance with a further embodiment, the spring element is in contact with a crank which is arranged on the cam disc and is configured in such a way that energy is stored in the spring element in a first rotational angular range of the cam disc, and energy is output from the spring element in a second rotational angular range. The design principle likewise makes it possible for the spring element to be arranged in a flexible manner with optimum utilization of the existing installation space.

The brake plunger can preferably be moved in a linearly guided manner along the plunger axis for the actuation of the brake lever. The movement of the brake plunger is preferably guided in a purely translational manner, in relation to its longitudinal axis.

In one alternative preferred embodiment, the brake plunger can be moved in a non-linearly guided manner for the actuation of the brake lever. An embodiment of this type makes it possible for the transmission of force from the cam disc to the brake plunger to be influenced not only by the shape of the cam disc, but rather also by the degrees of freedom of movement of the brake plunger along its movement itself, which assists an optimization of the force transmission function.

In the above text, the present disclosure has been described with reference to an electromechanical brake actuator. In a further aspect, the present disclosure relates, furthermore, to a disc brake, in particular a commercial vehicle disc brake having a brake disc, at least one brake lining for the generation of a brake action by being pressed onto the brake disc, a brake lever which is mounted such that it can be pivoted about a lever axis for pressing the at least one brake lining onto the brake disc, and a brake plunger which can be moved in the direction of a plunger axis and is coupled to the brake lever, in order to bring about the pivoting movement of the brake lever about the lever axis, and an electromechanical brake actuator which is coupled to the brake plunger, in order to bring about its movement in the direction of the above-described plunger axis.

The present disclosure solves the object which was designated at the outset in relation to the disc brake by the electromechanical brake actuator being configured in accordance with one of the preceding embodiments. A disc brake of this type combines the abovementioned advantages within it and serves, in particular, to provide a highly effective brake with a high reliability, a high ease of maintenance and a low power consumption with a required installation space which is as small as possible.

Exemplary embodiments of the present disclosure will now be described in the following text on the basis of the drawings. These are not necessarily intended to represent the exemplary embodiments to scale; rather, the drawings are configured in a diagrammatic and/or slightly distorted form where this is expedient for explanation purposes. Reference is made to the relevant prior art with regard to supplements of the teaching which can be seen directly from the drawings. It is to be taken into consideration here that a wide variety of modifications and amendments in relation to the shape and the detail of an embodiment can be performed without departing from the general concept of the present disclosure. The features of the present disclosure which are disclosed in the description, in the drawings and in the claims can be essential for the development of the present disclosure both individually and in any desired combination. In addition, all combinations of at least two of the features which are disclosed in the description, the drawing and/or the claims fall within the scope of the present disclosure. The general concept of the present disclosure is not restricted to the exact shape or the detail of the preferred embodiments which are shown and described in the following text, nor is it restricted to a subject matter which would be restricted in comparison with the subject matter which is claimed in the claims. In the case of dimensional ranges which are specified, values which lie within these limits are also intended to be disclosed as limit values and can be used and claimed as desired. For the sake of simplicity, identical designations are used in the following text for identical or similar parts or parts with an identical or similar function.

Further advantages, features and details of the present disclosure result from the following description of the preferred embodiments, and on the basis of the following drawings.

DETAILED DESCRIPTION OF THE DRAWINGS

Figure 1:
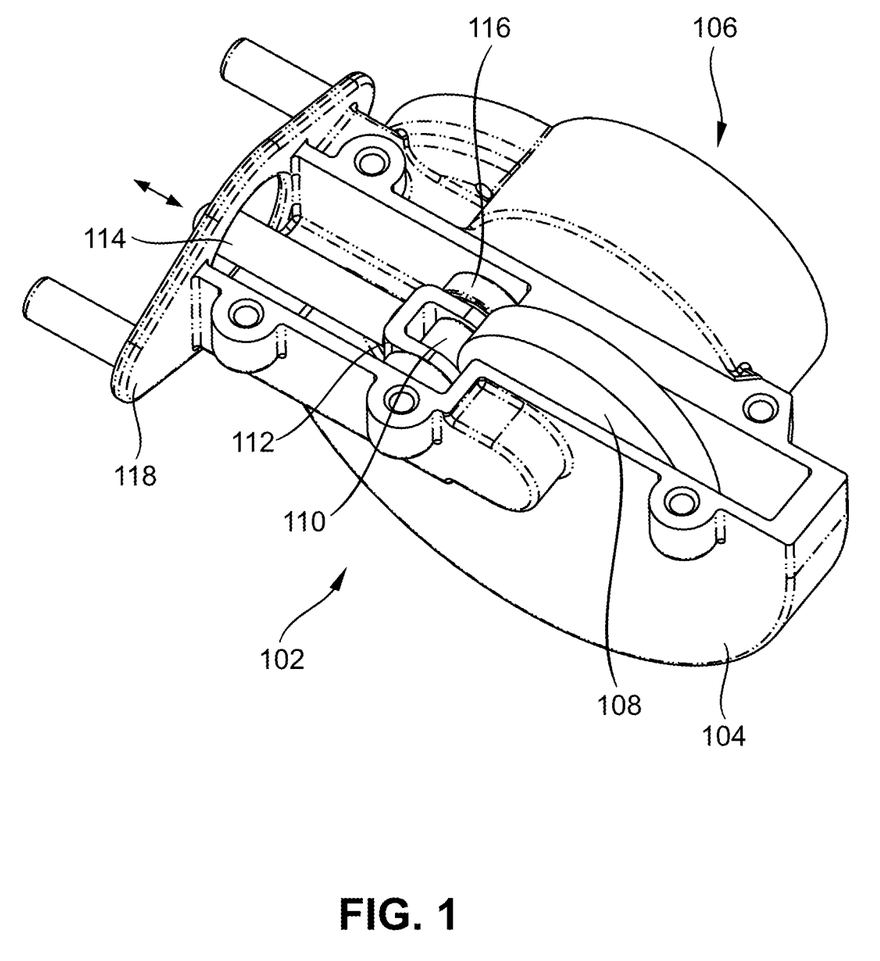
FIG. 1 shows a first exemplary embodiment of an electromechanical brake actuator in a side view.

FIG. 1 shows an electromechanical brake actuator 102 having a housing 104. The electromechanical brake actuator 102 has an electric motor 106. Via a gear mechanism (cf. FIG. 2), the drive torque of the electric motor 106 is transmitted to a cam disc 108. The cam disc 108 serves for the non-linear transmission of the rotational movement of the cam disc 108 to a brake plunger 114.

The brake plunger 114 can be deflected, in particular, in a linear manner in the direction of the arrow direction which is shown. At its end which faces the cam disc 108, the brake plunger 114 has a plunger head 112. This plunger head 112 encloses a rolling body 110 which is mounted via the bearings 116. The rolling body 110 slides on the circumference of the cam disc 108. In this way, a transmission of the rotational movement of the cam disc 108 into a linear movement of the brake plunger 114 is achieved. Via a connecting section 118, the electromechanical brake actuator 102 can be connected, in particular, to a brake (not shown).

Figure 2:
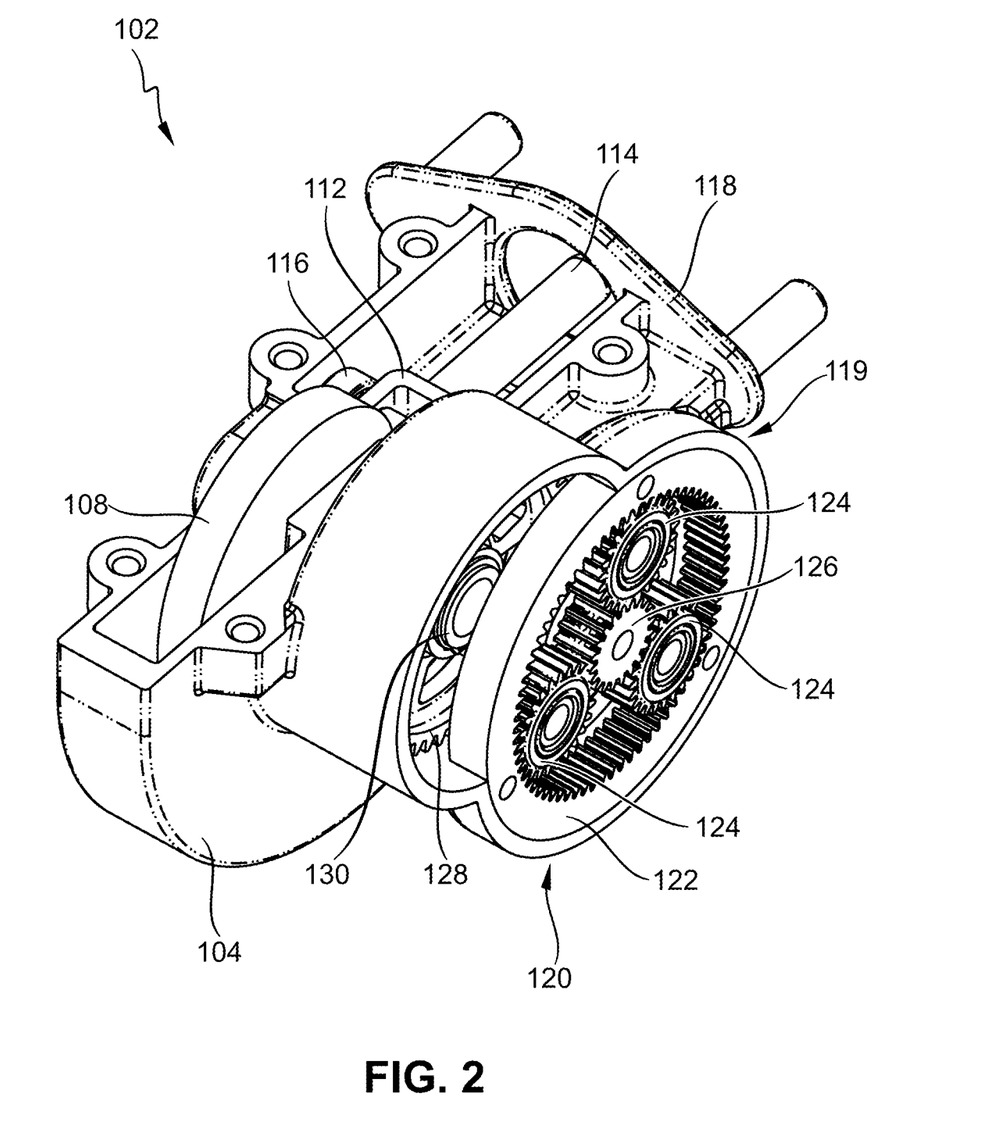
FIG. 2 shows the exemplary embodiment of the electromechanical brake actuator in accordance with FIG. 1, in a further side view.

FIG. 2 specifies the above-addressed gear mechanism 119. The gear mechanism 119 is of two-stage configuration. The first stage of the gear mechanism 119 is configured as an epicyclic gear mechanism 120. The epicyclic gear mechanism 120 has an internal gear 122, planetary gears 124 and a sun gear 126. In a manner which is known per se, a conversion of the movement variables of the electric motor 106 takes place in the epicyclic gear mechanism 120. A spur gear mechanism 128 is mounted downstream of the epicyclic gear mechanism 120. This spur gear mechanism 128 is connected to the epicyclic gear mechanism 120 via a further spur gear mechanism (not visible). The spur gear mechanism 128 is situated on a shaft 130, on which the cam disc 108 is also attached. In this way, a transmission of the drive torque takes place from the electric motor 106 via the gear mechanism 119 and the shaft 130 to the cam disc 108. It is to be understood that, according to the present disclosure, the gear mechanism 119 can be arranged in principle along the entire 360° around the rotational axis of the cam disc 108, in order to satisfy different installation space situations.

Figure 3:
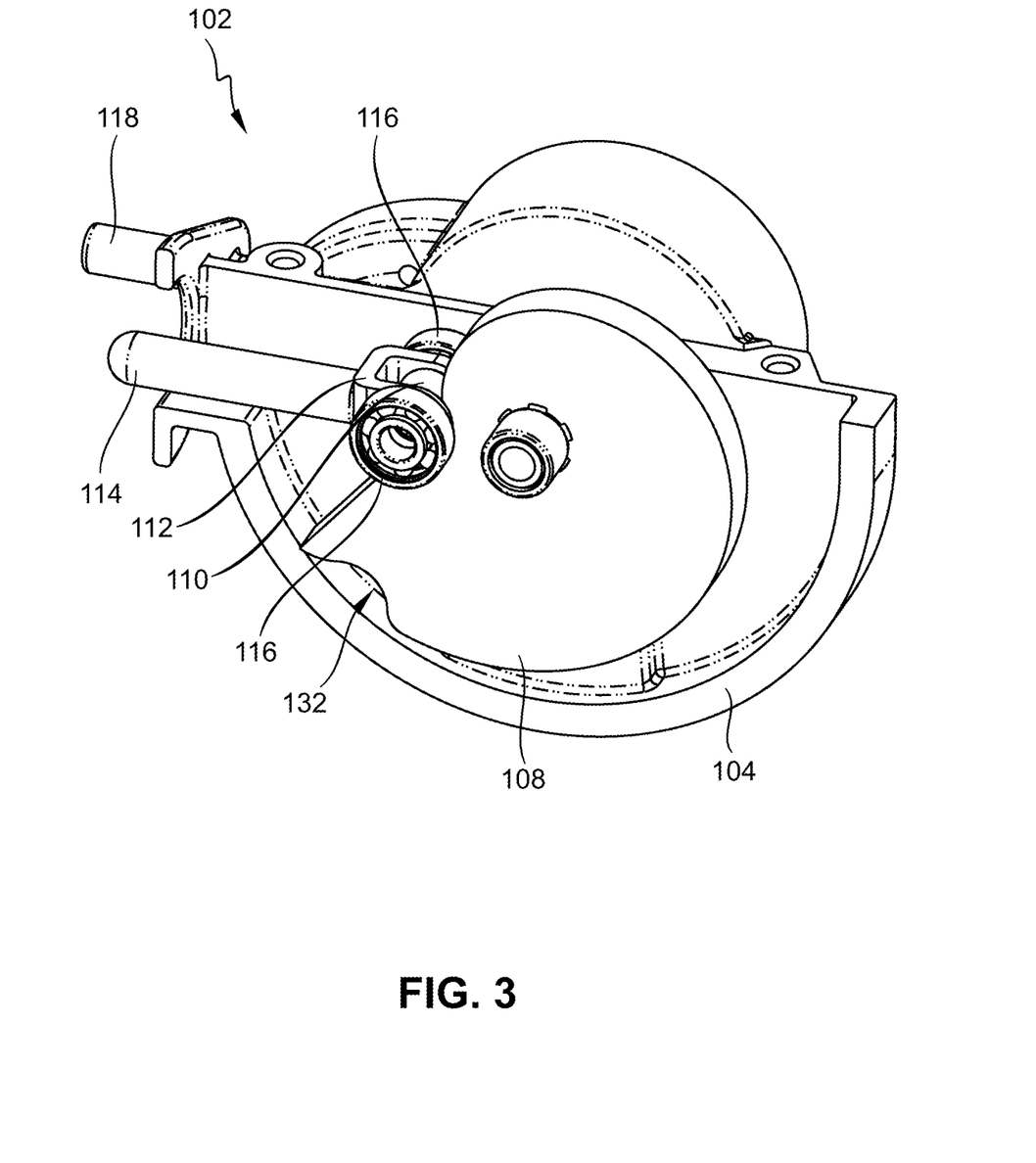
FIG. 3 shows the exemplary embodiment of the electromechanical brake actuator in accordance with FIGS. 1 and 2, in a partially sectioned side view.

One exemplary embodiment of the cam disc 108 can be gathered from FIG. 3. As shown in FIG. 3, the plunger 114 is situated in a completely retracted starting position. Here, the spacing between the rolling body 110 of the plunger head 112 and the rotational axis of the cam disc 108 is at its lowest. If the cam disc 108 is then rotated counter to the clockwise direction, a translation of the brake plunger 114 takes place on account of the shape of the cam disc 108. This results, in particular, from the fact that the contact angle between the brake plunger 114 and the cam disc 108 relative to the plunger axis becomes smaller as the rotation of the cam disc 108 out of the starting position increases.

Furthermore, this brings about the fact that a rotational angular change of the cam disc 108 leads, in the case of a shape of this type of the cam disc 108, to a rotational angular change of the cam disc 108 in a range of small deflections of the brake plunger 114 leading to a greater distance being overcome on the part of the brake plunger 114 with a smaller transmitted brake force, and, in the range of the maximum deflection 114 of the brake plunger, an equivalent rotational angular change of the cam disc 108 resulting in a smaller deflection of the brake plunger 114 with a higher transmitted brake force.

Furthermore, the cam disc 108 has an indentation 132. In the case of a rotation of the cam disc 108, the indentation 132 passes into contact with the rolling body of the brake plunger 114. If the rolling body 110 is situated in this position of the cam disc 108 in the indentation 132, the cam disc 108 and therefore the brake plunger 114 remain in this position, even if the electric motor 106 feeds in no further energy. Therefore, a parking brake position is defined via the positioning of the indentation 132, in which parking brake position the brake plunger 114 latches in a desired deflection.

Figure 4:
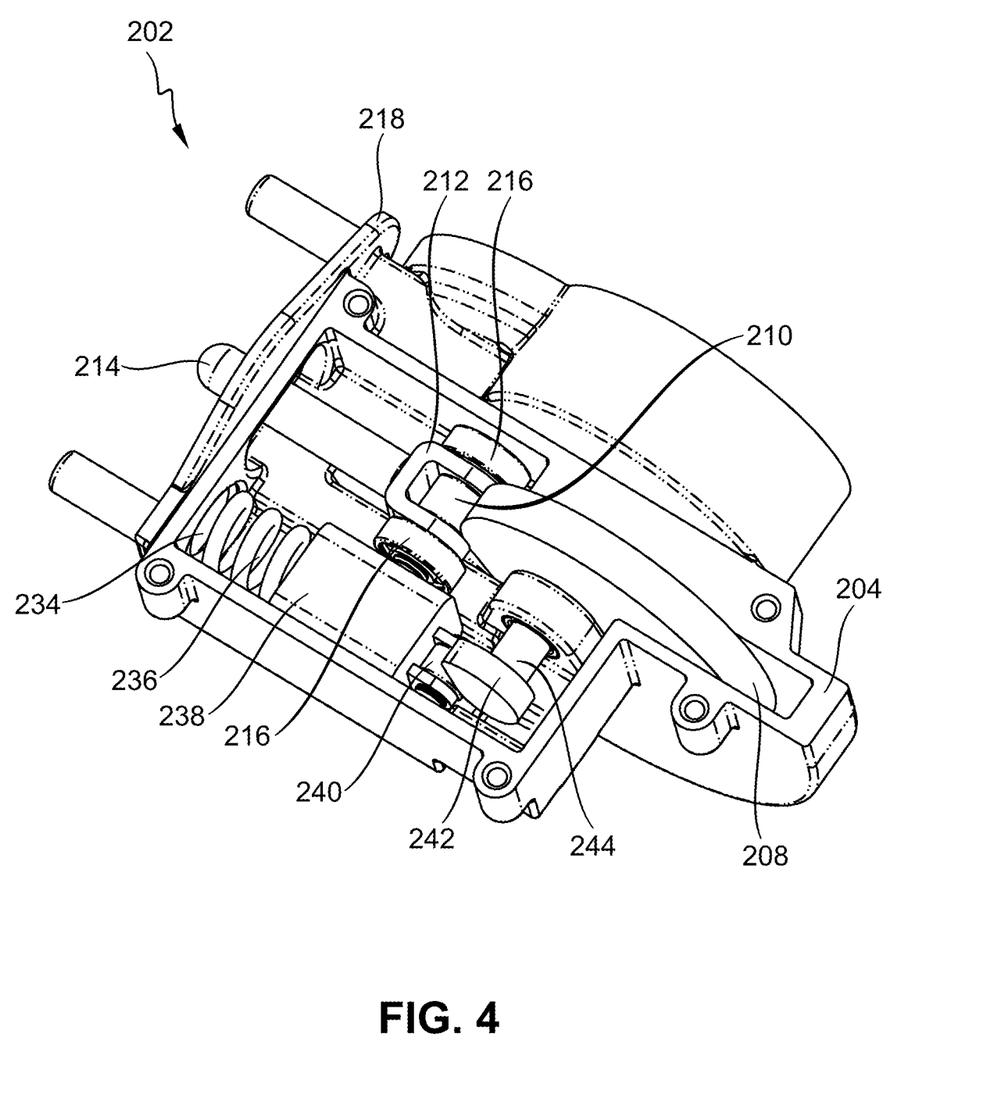
FIG. 4 shows a second exemplary embodiment of an electromechanical brake actuator, in a plan view.

A second exemplary embodiment of the electromechanical brake actuator 202 is shown in FIG. 4. The electromechanical brake actuator 202 again has a housing 204 and an electric motor, downstream of which a gear mechanism is mounted (both components are not shown in FIG. 4). A drive torque is transmitted in a known way to the cam disc 208. The cam disc 208 again serves to transmit the rotational movement of the drive into a translational movement of the brake plunger 214. The brake plunger 214 has a brake plunger head 212 which encloses a rolling body 210 which is mounted with the aid of the bearings 216. A camshaft 244 with a cam 242 is arranged on the shaft (not shown). The cam 242 is set up via the rolling body 240 and the spring guide 238 to actuate a spring element 236 which is guided in the spring bearing 234 and is fastened in the housing 204. It is provided here that the cam 242 compresses and therefore tensions the spring element 236 and stores energy in a first movement range, and receives the energy which is stored in the spring element 236 in a second movement range and outputs it to the camshaft 244 which is coupled to the cam disc 208. Moreover, the cam 244 is set up to define a latching position. While a specific arrangement of the energy storage components and output components (cam 242, rolling body 240, spring guide 238, spring element 236, spring bearing 234) is shown in the Figs., it is to be understood that, according to the present disclosure, these elements can in principle be arranged freely with respect to around the rotational axis of the cam disc 208, in order to satisfy specific installation space requirements as best as possible, for example in the vehicle.

Figure 5:
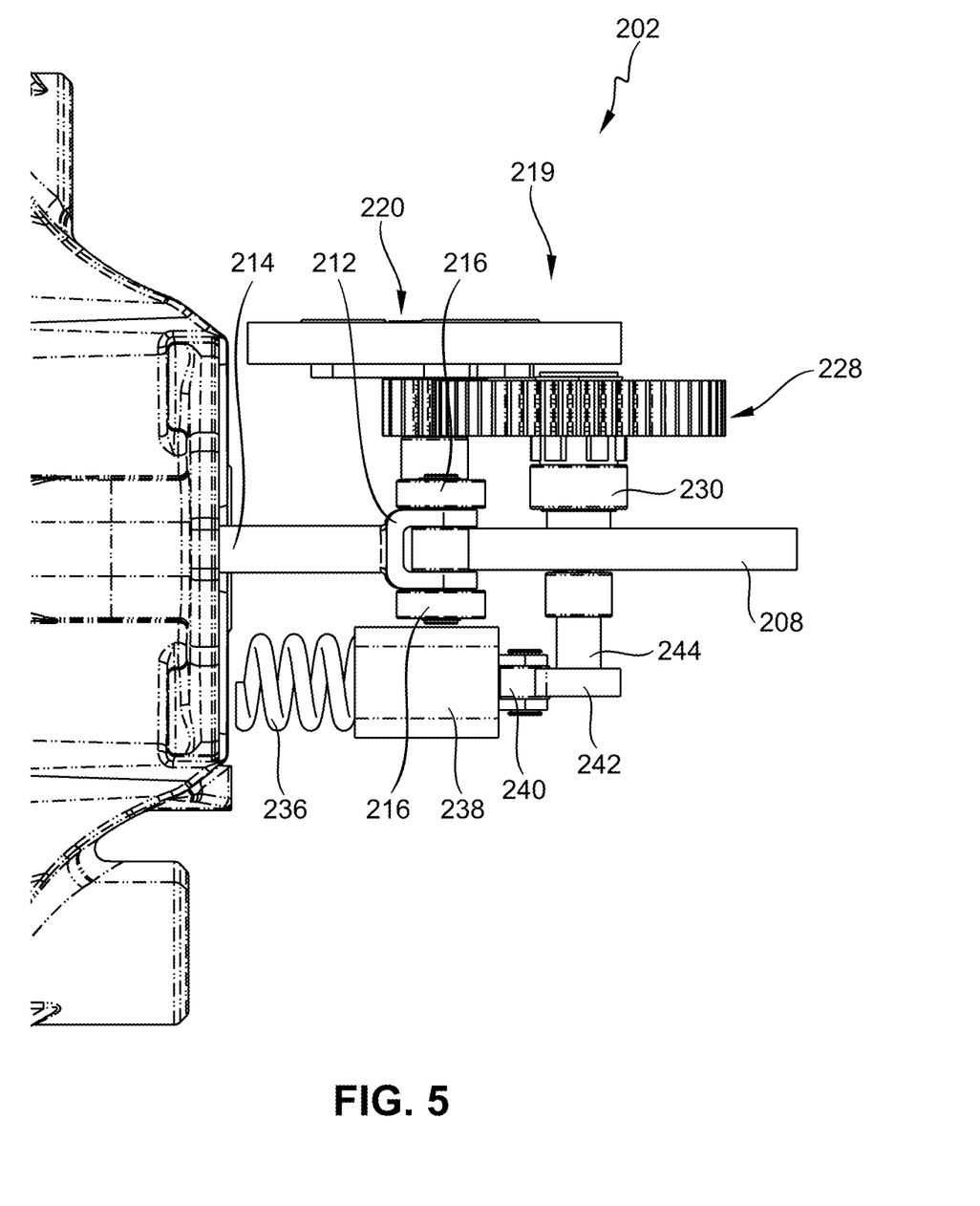
FIG. 5 shows a plan view of the actuator in accordance with FIG. 4.

FIG. 5 shows a plan view of the embodiment which is already known from FIG. 4, without the relevant housing. The construction of the gear mechanism 219 can then be gathered from FIG. 5. The gear mechanism 219 has the epicyclic gear mechanism 220 as a first stage. A further rotational speed reduction and torque increase take place in the gear mechanism 219 via a spur gear mechanism 228. The shaft 230, on which the cam disc 208 is fastened, is connected downstream of the gear mechanism 219.

Figure 6:
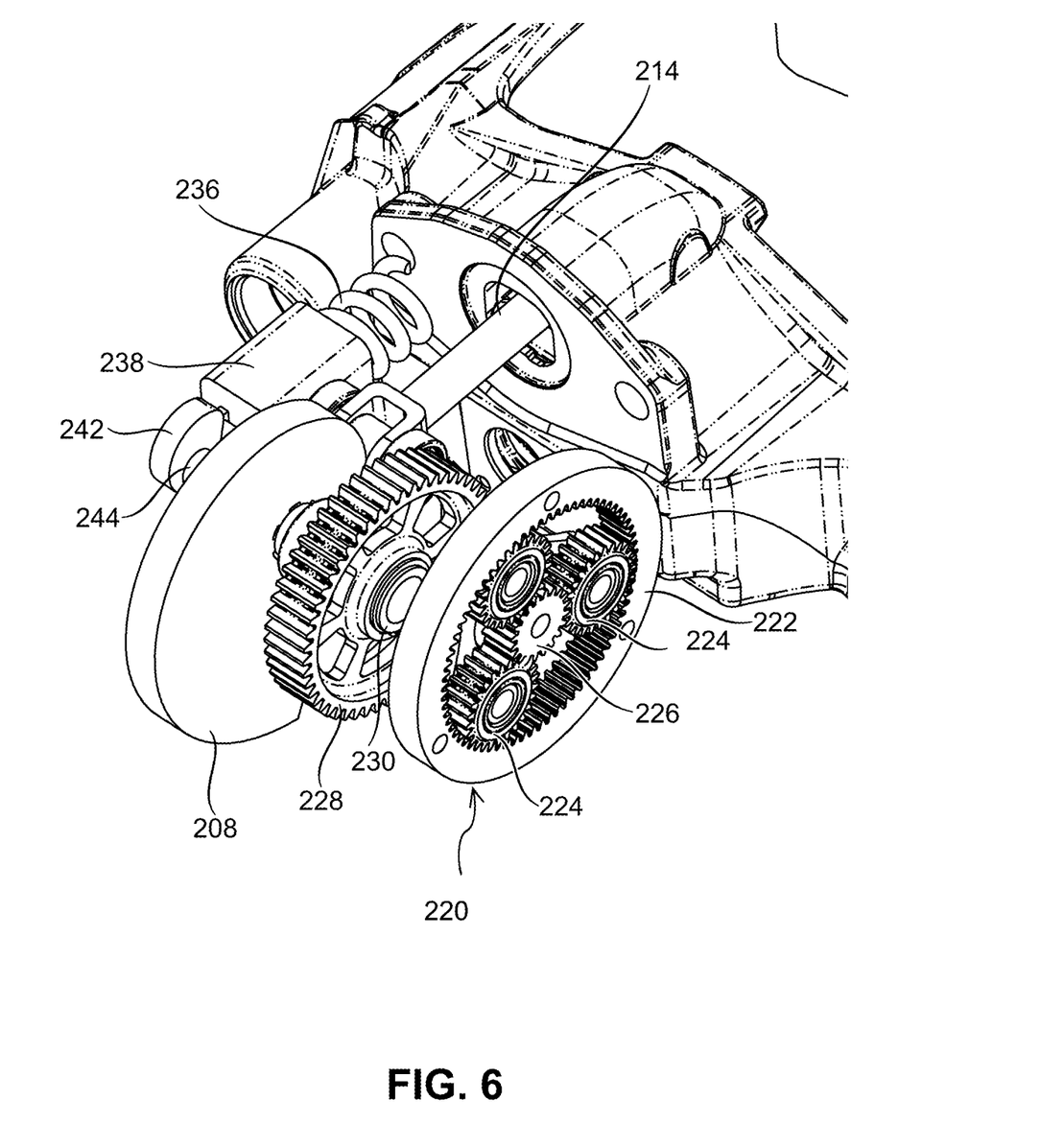
FIG. 6 shows the exemplary embodiment of the electromechanical brake actuator in accordance with FIGS. 4 and 5, in a view obliquely from above without a housing.

FIG. 6 shows a side view of the second exemplary embodiment. In particular, the construction of the epicyclic gear mechanism 220 can be gathered herefrom. In a manner known per se, this epicyclic gear mechanism 220 has an internal gear 222, in which the planetary gears 224 are arranged. The sun gear 226 is situated centrally in the epicyclic gear mechanism 220.

Figure 7:
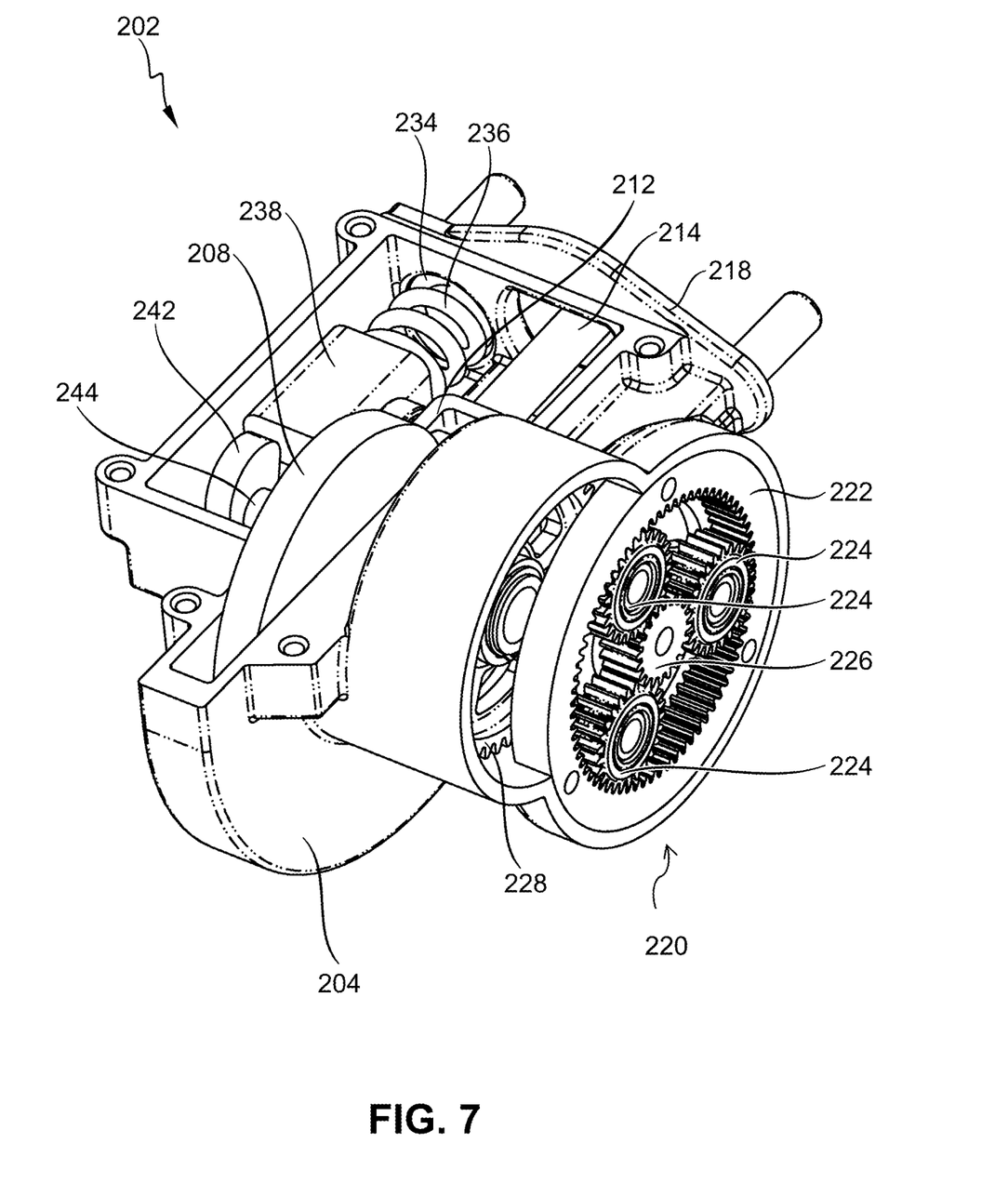
FIG. 7 shows the exemplary embodiment of the electromechanical brake actuator in accordance with FIGS. 4-6, in a view obliquely from above.

FIG. 7 shows a side view of the second exemplary embodiment in a partially sectioned illustration.

Figure 8:
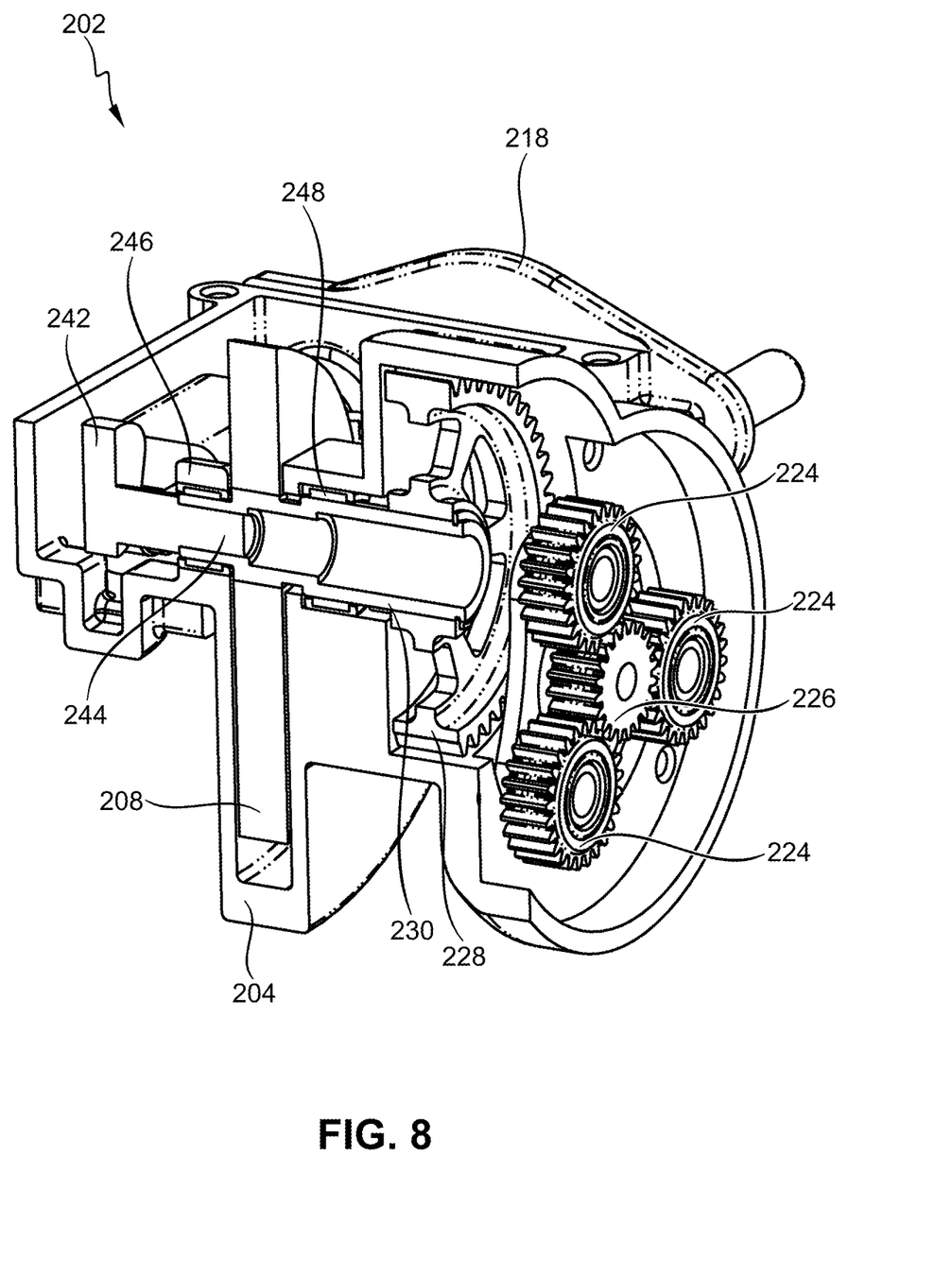
FIG. 8 shows the exemplary embodiment of the electromechanical brake actuator in accordance with FIGS. 4-7, in a partially sectioned view.

FIG. 8 shows a sectional view of the electromechanical brake actuator 202 with a sectional plane along the shaft 230. As can be gathered from the Fig., the shaft 230 is not configured as the same component as the camshaft 244, but is connected to the latter, in particular in a non-positive manner.

Figure 9:
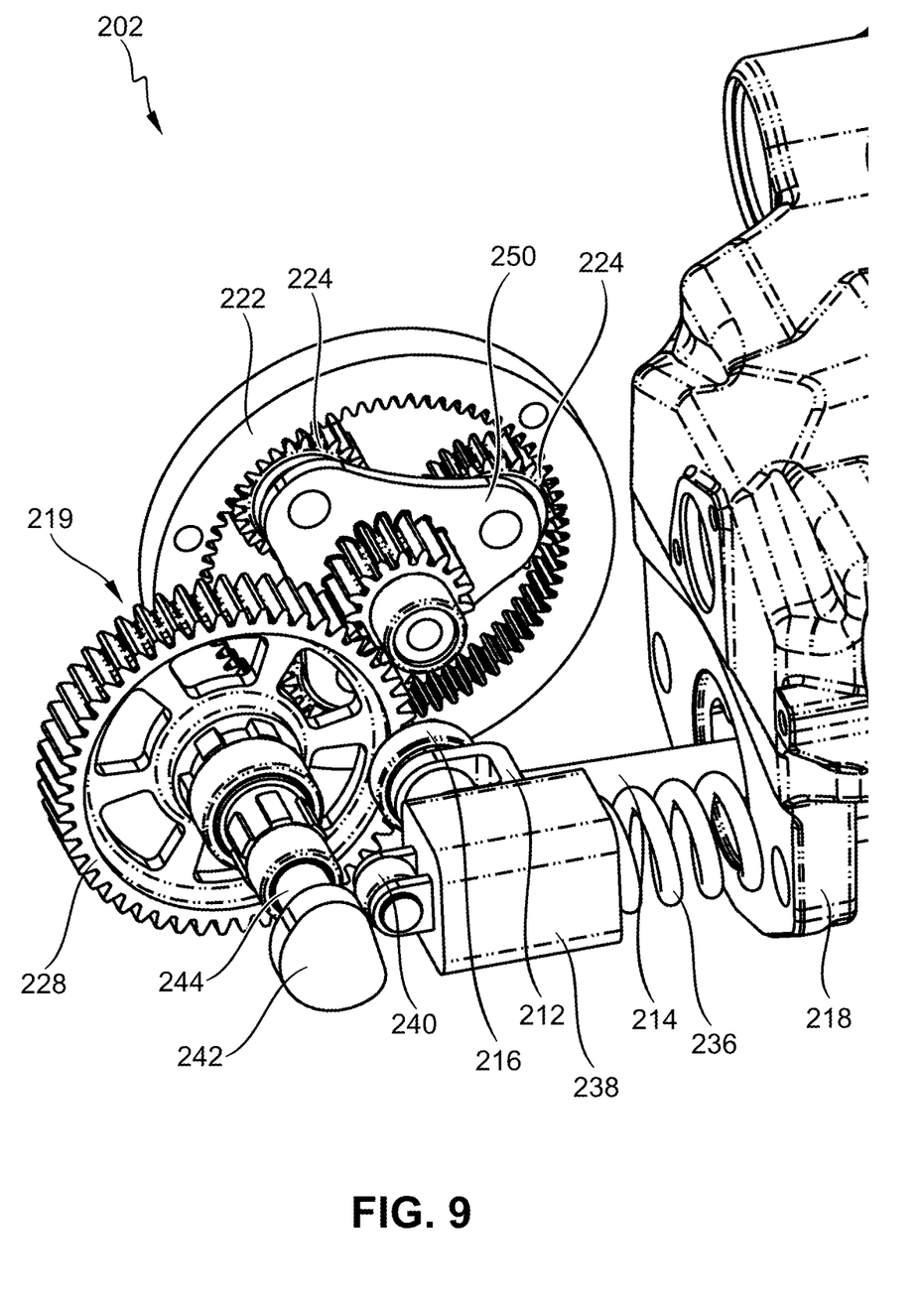
FIG. 9 shows the exemplary embodiment of the electromechanical brake actuator in accordance with FIGS. 4-8, in a side view without a housing.

The gear mechanism 219 is exposed in FIG. 9. In addition to the Figs. which have already been discussed, it can be gathered from FIG. 9 that the planetary gears 224 are arranged on a spider 250.

Figure 10:
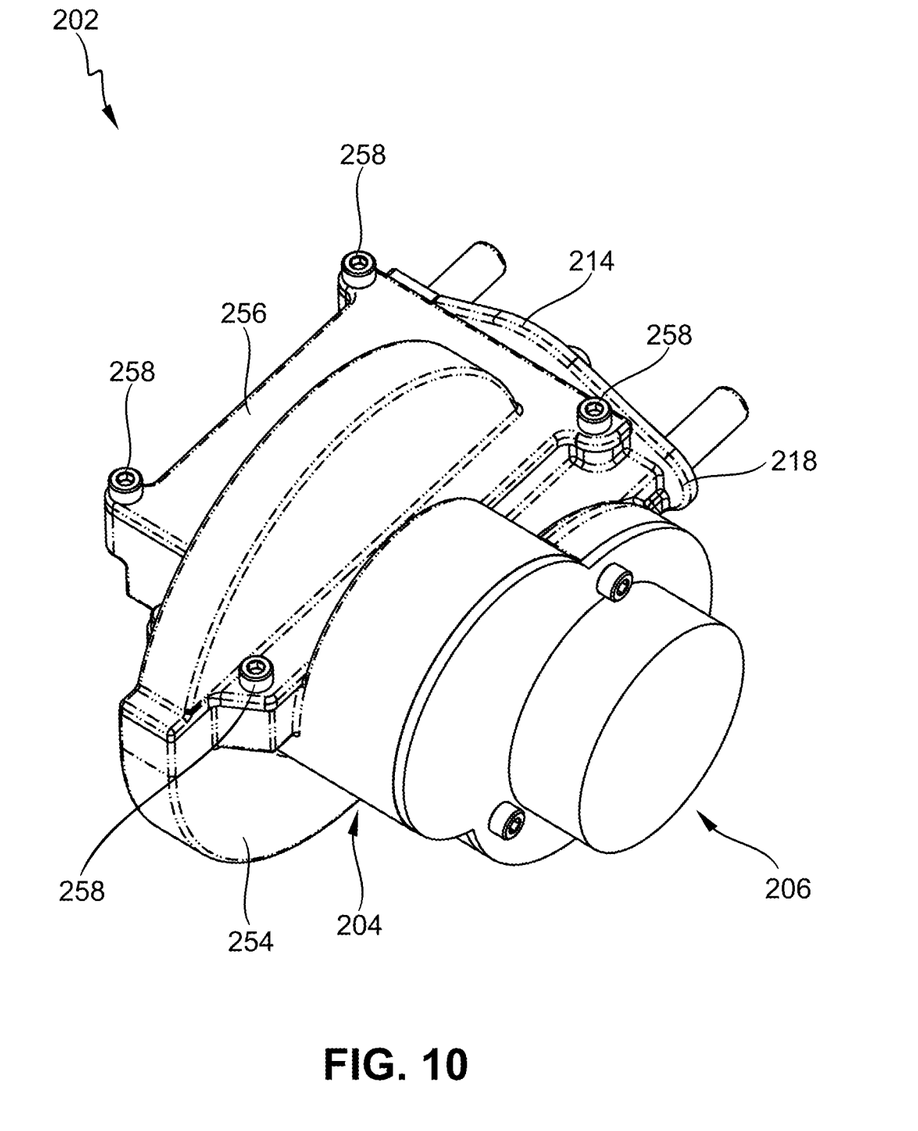
FIG. 10 shows the exemplary embodiment of the electromechanical brake actuator in accordance with FIGS. 4-9, with a closed housing.

FIG. 10 shows the closed housing 204 of the electromechanical brake actuator 202. The housing 204 has a first housing section 254 and a second housing section 256. The housing sections 254 and 256 are connected to one another by the screws 258.

Figure 11:
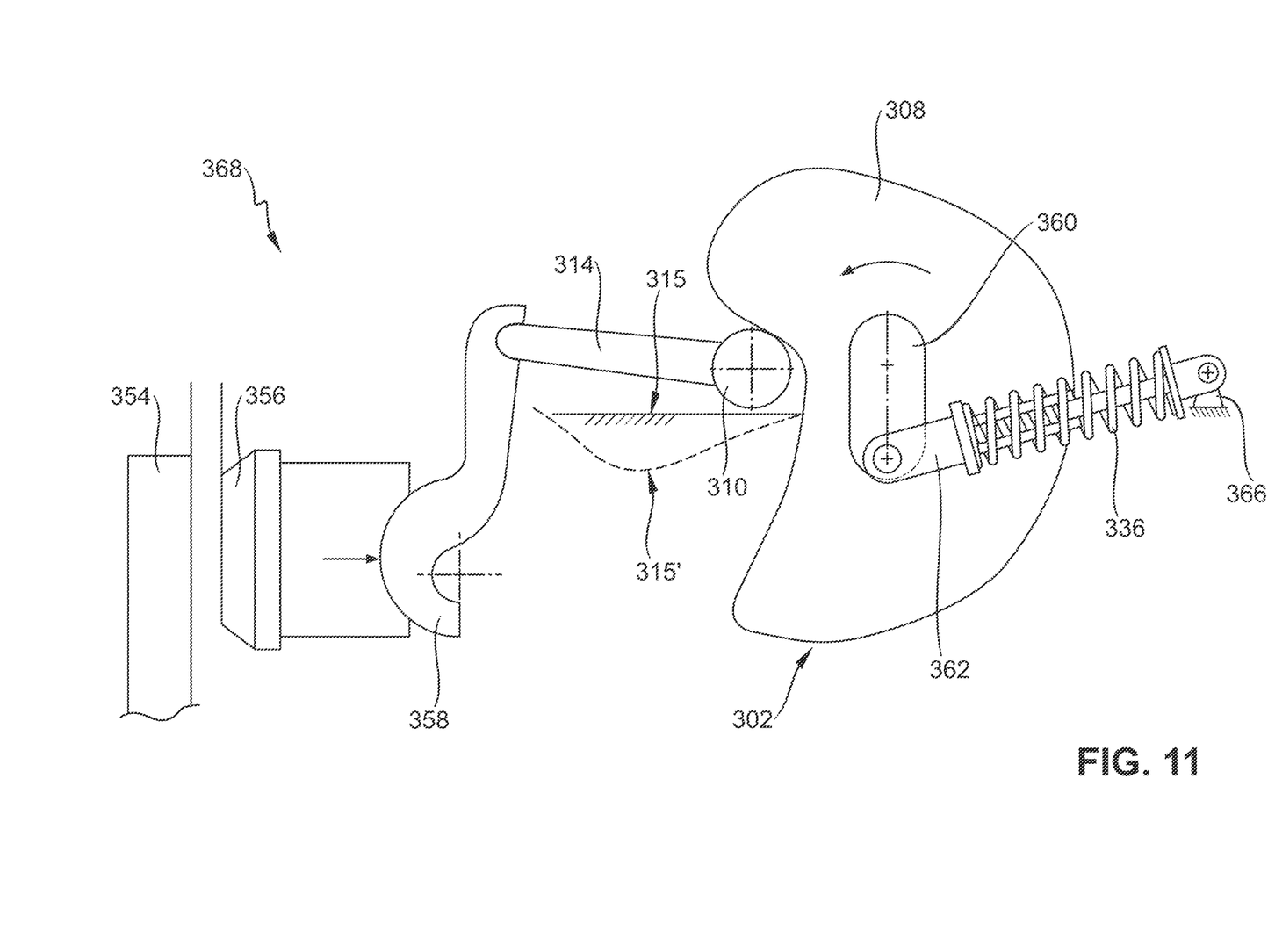
FIG. 11 shows a third exemplary embodiment of an electromechanical brake actuator and of a disc brake, in a side view.

FIG. 11 shows a third exemplary embodiment of an electromechanical brake actuator 302 according to the present disclosure and a disc brake 368 according to the present disclosure, in a side view. The operating principle of the disc brake 368 consists in that a brake lining 356 is pressed onto a brake disc 354 after overcoming an air gap. The friction which occurs brakes a wheel (not shown) which is connected to the brake disc 354. As an alternative, an electromechanical brake actuator 102, 202, 402 in accordance with one of the remaining exemplary embodiments can be installed in the disc brake 368.

The force which is required to this end is transmitted to the brake lining 356 via the brake lever 358. The brake lever 358 is in turn actuated by the brake plunger 314. The latter is actuated in a known way by the cam disc 308.

Two alternative brake plunger guides 315, 315' are shown with regard to the guidance of the brake plunger 314. The straight brake plunger guide 315 serves for the purely linear (translational) guidance of the brake plunger 314.

As an alternative, a curved brake plunger guide 315' can be provided which makes non-linear guidance of the brake plunger 314 possible.

Moreover, the electromechanical brake actuator 302 which is shown here has a lever 360 which is coupled to the cam disc 308. A spring head 362 is fastened to the lever 360, which spring head 362 is in turn connected to a spring element 336. A bearing 366 is situated at the other end of the spring element 336. The spring element 336 is again set up to output energy to the spring element 336 in a manner which is dependent on the rotational angle of the lever 360 and therefore of the cam disc 308, with the result that this spring element 336 is compressed and stores energy. Moreover, the spring element 336 is set up to transmit energy via the spring head 362 to the lever 360 and the cam disc 308 in a manner which is dependent on the rotational angular range thereof. With regard to the fundamental operating principle, reference is to be made to the above comments. It is to be understood that the arrangement comprising the lever 360 and the corresponding energy storage and output components (spring head 362, bearing 366, spring 336) can in principle be positioned freely around the cam disc 308 according to the present disclosure.

Figure 12:
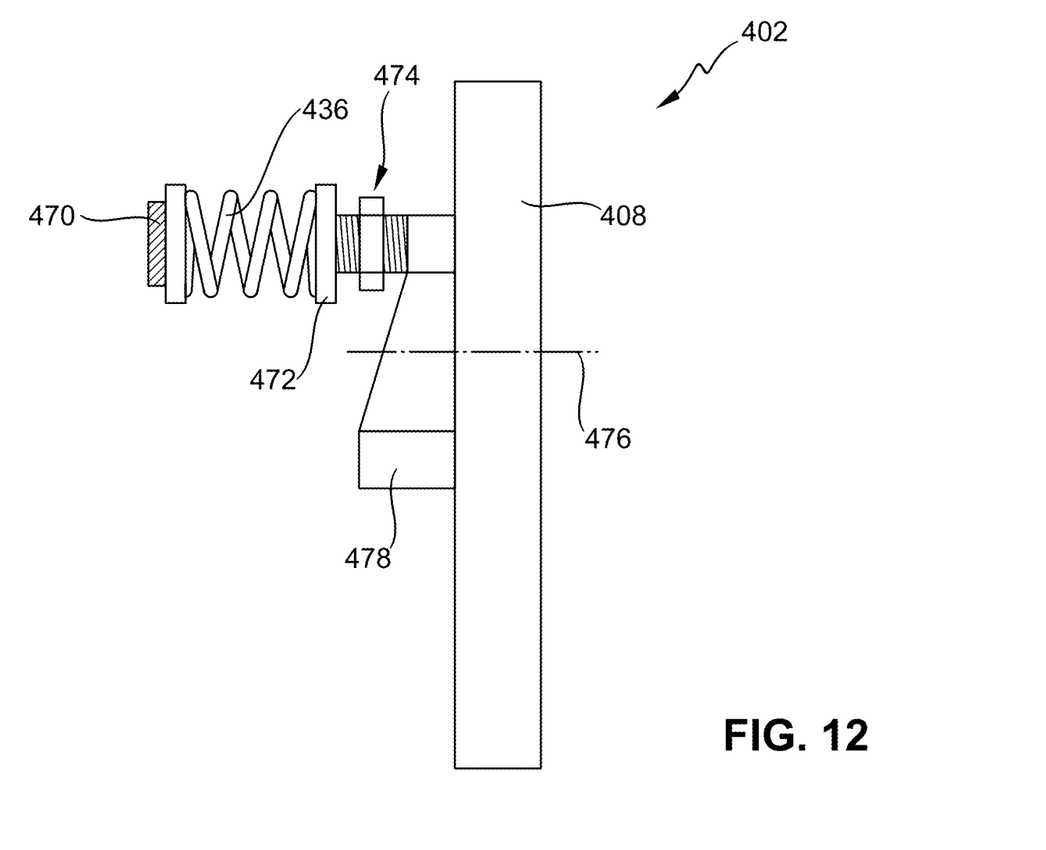
FIG. 12 shows a fourth exemplary embodiment of an electromechanical brake actuator, in an axial partial section.

FIG. 12 shows a further alternative embodiment of this device for storing and outputting energy. An axial track 478 is applied to the cam disc 408. This axial track 478 extends in the axial direction on one side of the cam disc 408, and exhibits different axial extents. A roller bearing 474 which acts via a spring head 472 on a spring element 436 is in contact with the axial track 478. The spring element 436 is mounted in a stationary manner via a bearing 470.

In the case of rotation of the cam disc 408, the roller bearing 474 follows the axial track 478 in the axial direction. If the roller bearing 474 moves in the direction of the bearing 470 here, the spring element 436 which is arranged between the bearing 470 and the spring head 472 is compressed and energy is stored in it as a consequence.

If, in contrast, the roller bearing 474 moves on such a section of the axial track 478, in the case of which the roller bearing 474 moves in the direction of the cam disc 408, the spring element 436 assists the rotational movement of the cam disc 408 and outputs its stored energy to the latter as a consequence. It is to be understood that the positioning of the axial track 478 is in principle possible on both sides of the cam disc 408.

Figure 13:
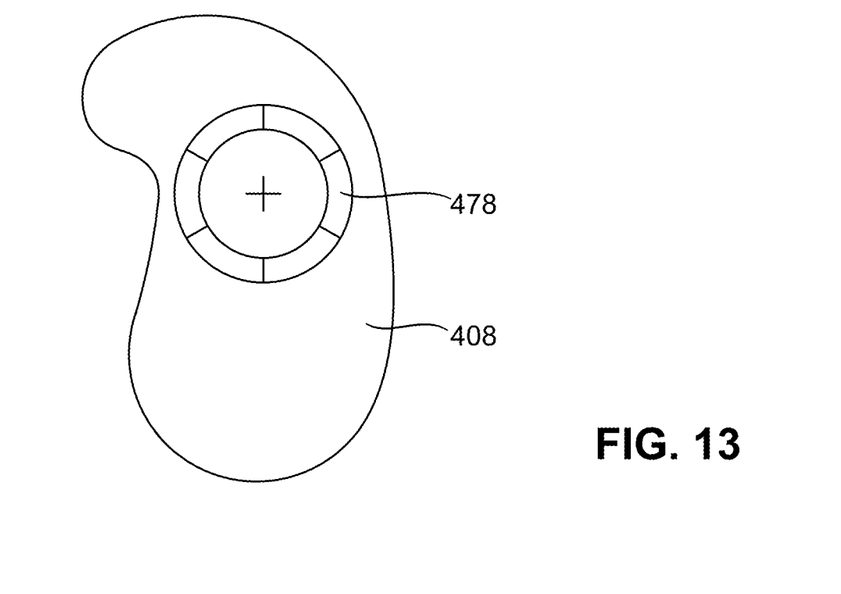
FIG. 13 shows the exemplary embodiment of the electromechanical brake actuator in accordance with FIG. 12, in a plan view of the cam disc.

FIG. 13 shows a plan view of a cam disc 408 of this type which is provided with an axial track 478. Here, the axial track 478 is arranged in a manner which is centered about the rotational axis 476 of the cam disc 408.

While the above description constitutes the preferred embodiments of the present invention, it will be appreciated that the invention is susceptible to modification, variation and change without departing from the proper scope and fair meaning of the accompanying claims.

The invention claimed is:

1. An electromechanical brake actuator (102, 202, 302, 402) for a brake, comprising:
an electric motor (106, 206) for generating a drive torque,
a cam disc (108, 208, 308, 408) operatively connected to the electric motor (106, 206) and rotatable, and
a brake plunger (114, 214, 314) which can be moved along a plunger axis, wherein the brake plunger actuates a brake lever (358) of a brake (368),
wherein each of the cam disc (108, 208, 308, 408) and the brake plunger (114, 214, 314) has a contact face respectively in contact with one another and sliding or rolling on one another for a direct transmission of the drive torque between the cam disc (108, 208, 308, 408) and the brake plunger (114, 214, 314);
wherein the brake plunger has an end facing the cam disc, wherein the end facing the cam disc includes a plunger head (112, 212), wherein the plunger head (112, 212) encloses a rolling element (110, 210) mounted by way of bearings (116, 216), the rolling element (110, 210) including the contact face of the brake plunger;
wherein the contact face of the cam disc is an outwardly facing surface;
wherein the contact face of the brake plunger is an outwardly facing surface;
wherein contact between the cam disc and brake plunger occurs between the respective outwardly facing surfaces of the cam disc and the brake plunger;
wherein the contact faces of the cam disc and brake plunger slide or roll on one another for the direct transmission of drive torque between the cam disc and the brake plunger.

2. The electromechanical brake actuator (102, 202, 302, 402) as claimed in claim 1, wherein the contact face of the cam disc (108, 208, 308, 408) is configured for a non-linear transmission of force from the cam disc (108, 208, 308, 408) to the brake plunger (114, 214, 314) in dependence on an angular position between the cam disc (108, 208, 308, 408) and the plunger axis (114, 214, 314).

3. The electromechanical brake actuator (102, 202, 302, 402) as claimed in claim 1, wherein the brake plunger (114, 214, 314) can be moved back and forth between a withdrawn position and a deflected position, and the cam disc (108, 208, 308, 408) can be moved back and forth between a starting position and an end position, the starting position of the cam disc (108, 208, 308, 408) corresponding to the withdrawn position of the brake plunger (114, 214, 314), and the end position of the cam disc (108, 208, 308, 408) corresponding to the deflected position of the brake plunger (114, 214, 314).

4. The electromechanical brake actuator (102, 202, 302, 402) as claimed in claim 3, wherein the contact faces of the brake plunger (114, 214, 314) and the cam disc (108, 208, 308, 408) bear against one another at a contact point, and define a contact angle relative to the plunger axis (114, 214, 314) at the contact point, wherein the contact angle decreases in size from the starting position with an increasing rotation of the cam disc (108, 208, 308, 408).

5. The electromechanical brake actuator (102, 202, 302, 402) as claimed in claim 1, further comprising a gear mechanism (119, 219) driven by the electric motor (106, 206) and operatively connected to the cam disc (108, 208, 308, 408).

6. The electromechanical brake actuator (102) as claimed in claim 1, wherein the cam disc (108) has a circumference with an indentation (132) for defining a parking brake position, the indentation (132) being arranged between a contact point with the brake plunger (114) in a starting position of the cam disc and a contact point with the brake plunger (114) in an end position of the cam disc.

7. The electromechanical brake actuator (102) as claimed in claim 6, wherein the indentation (132) is arranged such that the brake plunger (114) transmits a brake power in a range of from approximately 80% to approximately 100% of an overall brake power when the brake plunger is disposed in the indentation (132).

8. The electromechanical brake actuator (202, 302) as claimed in claim 1, further comprising a spring element (236, 336, 436) operatively connected to the electric motor (206) such that energy is stored in a first deflection distance region of the brake plunger, and energy is output to the brake plunger in a second deflection distance region of the brake plunger.

9. The electromechanical brake actuator (202) as claimed in claim 8, wherein the spring element (236) has an interaction face in contact with a circumferential face of a cam (242) driven by the electric motor, the interaction face of the spring element (236) and the circumferential face of the cam (242) sliding or rolling on one another, and the circumferential face of the cam (242) being shaped such that energy is stored in the spring element (236) in a first rotational angular range of the cam (242), and energy is output from the spring element (236) in a second rotational angular range of the cam.

10. The electromechanical brake actuator (202) as claimed in claim 9, wherein the cam (242) has a cam shaft, a circumference, and a third rotational angular range, along of which the cam shaft is substantially constantly spaced from the circumference of the cam (242).

11. The electromechanical brake actuator (202) as claimed in claim 10, wherein the spring element (236) exerts a spring force that inhibits a rotation of the cam (242) in the third rotational angular range of the cam (242) and holds the brake plunger (214) in a corresponding deflection when the drive torque of the electric motor (206) is discontinued.

12. The electromechanical brake actuator (402) as claimed in claim 8, wherein the spring element (436) has a spring head (472) in contact with a track (478) applied on the cam disc (408) in an axial direction, wherein the spring element (436) stores energy in dependence on the rotational angular range of the cam disc (408), and energy is output from the spring element (436) in a second rotational angular range.

13. The electromechanical brake actuator (302) as claimed in claim 8, wherein the spring element (336) is in contact with a lever (360) arranged on the cam disc (308) and the spring element (336) stores energy in dependence on the rotational angular range of the cam disc (308), and energy is output from the spring element (336) in a second rotational angular range.

14. The electromechanical brake actuator (102, 202, 302, 402) as claimed in claim 1, wherein the brake plunger (114, 214, 314) is linearly guided for actuating the brake lever (358).

15. The electromechanical brake actuator (102, 202, 302, 402) as claimed in claim 1, wherein the brake plunger (314) is non-linearly guided for actuating the brake lever (358).

16. A disc brake (368), in particular a commercial vehicle disc brake having:
an electromechanical brake actuator according to claim 1;
a brake disc (354),
at least one brake lining (356) for the generation of a brake action by means of being pressed onto the brake disc (354),
wherein the brake lever (358) is mounted such that it can be pivoted about a lever axis, wherein the brake lever presses the at least one brake lining (356) onto the brake disc (354), and
wherein the brake plunger (314) is moveable in the direction of a plunger axis and is coupled to the brake lever (358) and brings about the pivoting movement of the brake lever (358) about the lever axis, and
wherein the electromechanical brake actuator (102, 202, 302, 402) brings about movement of the brake plunger (314) in the direction of the plunger axis.

17. An electromechanical brake actuator (102, 202, 302, 402) for a brake, comprising:
an electric motor (106, 206) for generating a drive torque,
a cam disc (108, 208, 308, 408) operatively connected to the electric motor (106, 206) and rotatable, and
a brake plunger (114, 214, 314) which can be moved along a plunger axis for actuating a brake lever (358) of a brake (368),
wherein each of the cam disc (108, 208, 308, 408) and the brake plunger (114, 214, 314) has a contact face respectively in contact with one another and sliding or rolling on one another for a direct transmission of the drive torque between the cam disc (108, 208, 308, 408) and the brake plunger (114, 214, 314);
wherein the brake plunger has an end facing the cam disc, wherein the end facing the cam disc includes a plunger head (112, 212), wherein the plunger head (112, 212) encloses a rolling element (110, 210) mounted by way of bearings (116, 216), the rolling element (110, 210) including the contact face of the brake plunger;
wherein the contact faces of the cam disc and brake plunger slide or roll on one another for the direct transmission of drive torque between the cam disc and the brake plunger; and
a spring element (236, 336, 436) operatively connected to the electric motor (206) such that energy is stored in a first deflection distance region of the brake plunger, and energy is released and output to the brake plunger in a second deflection distance region of the brake plunger, wherein the second deflection distance follows the first deflection distance in a direction of brake plunger actuation along the plunger axis;
wherein the spring element (336, 436) stores energy in dependence on a rotational angular range of the cam disc (308, 408), wherein the rotational angular range of the cam disc includes a first rotational angular range and a second rotational angular range following the first angular range in a first rotational direction, and energy is released and output from the spring element (336, 436) in the second rotational angular range.

18. The electromechanical brake actuator of claim 1, wherein the bearings (116, 216) are disposed on laterally opposite sides of the plunger head (112, 212) outside of the plunger head (112, 212) that encloses the roller (110, 210).

19. The electromechanical brake actuator of claim 1, wherein the plunger head (112, 212) includes laterally opposed wall sections defining a space therebetween, wherein the roller (110, 210) is disposed within the space and extends laterally across substantially the entire space between the wall sections.

20. The electromechanical brake actuator of claim 1, wherein the cam disc extends partially into a space defined by the plunger head (112, 212) that includes the roller (110, 210), wherein contact between the roller (110, 210) and the cam disc occurs within the plunger head (112, 212).

* * * * *